United States Patent

Petropoulas et al.

[15] 3,641,350
[45] Feb. 8, 1972

[54] INFRARED ANALYZER FOR INDICATING THE SCINTILLATION SPECTRUM, SHIMMER AND MODULATION TRANSFER FUNCTION OF THE RADIATION PATH

[72] Inventors: Spyros K. Petropoulas, Brookeville; Robert E. Jehle, Wheaton, both of Md.; Mendel M. Halberstam, Brooklyn, N.Y.

[73] Assignee: The United States of America as represented by the Secretary of the Navy

[22] Filed: Sept. 8, 1970

[21] Appl. No.: 70,061

[52] U.S. Cl. .................................... 250/83.3 H, 356/124
[51] Int. Cl. .................................................... G01j 3/34
[58] Field of Search ..................... 250/83.3 H; 356/124

[56] References Cited

UNITED STATES PATENTS 3,316,404  4/1967  Cruse.............................250/83.3 H Primary Examiner—James W. Lawrence
Assistant Examiner—Morton J. Frome
Attorney—Richard S. Sciascia, Louis B. Applebaum and Ernest F. Weinberger

[57] ABSTRACT

The radiant energy from a known live source impinges on a radiation collector which in turn directs the energy through a movable slit on to a rotating reticle having alternate reflecting and transmitting segments. A reference source also directs energy on to the reticle and the reticle output is directed toward a sensor whose output is processed by a differential amplifier and a signal amplifier. A reference phase generator circuit controls the gain of the differential amplifier. The output of the signal amplifier is further processed to provide only the low frequencies, which are then amplified and analyzed to provide a scintillation spectrum. A shimmer output is obtained by eliminating the low frequencies and applying the resultant to a limiter and a discriminator. The modulation transfer function is derived by combining, in an operational amplifier, the low-passed frequencies from the signal amplifiers and the peak detected high frequencies.

6 Claims, 3 Drawing Figures

INFRARED ANALYZER FOR INDICATING THE SCINTILLATION SPECTRUM, SHIMMER AND MODULATION TRANSFER FUNCTION OF THE RADIATION PATH

The invention described herein may be manufactured and used by or for the Government of the United States of America for governmental purposes without the payment of any royalties thereon or therefor.

BACKGROUND OF THE INVENTION

1. Field of the Invention

The present invention relates to optical image analyzers and more particularly pertains to infrared image analyzers for measuring the modulation transfer function, scintillation and shimmer introduced by the medium between the source and the analyzer.

2. Description of the Prior Art

In the field of optical transfer measurements, it has been the general practice to employ a number of separate instruments to make one or more of the aforementioned measurements, but none of the existing instruments are capable of performing all the tasks. In addition, whereas all of these measurements in question have been made in the visible, and some in the infrared, no measurements have been made of the atmospheric modulation transfer function (MTF), scintillation, and shimmer in the 3 to 5 and 8 to 14 micron spectral regions. The work that has been done in the visible region of the spectrum can not be adapted to evaluating the above atmospheric properties in the infrared. The present invention fills this need.

SUMMARY OF THE INVENTION

The general purpose of this invention is to provide an infrared image analyzer that has all the advantages of similar employed prior art devices and has none of the above-described disadvantages. To attain this, the present invention provides a unique arrangement wherein the radiated energy from a known live source is processed electrically after it has been gathered and directed through a movable slit and on to a rotating reticle made up of alternate transmissive and reflective wedges. Simultaneously, a reference energy level is applied for comparison purposes. The primary processing channel includes a sensor, a differential amplifier and signal amplifiers. Scintillation and shimmer spectrums are obtained by removing either the low- or high-frequency components from the primary channel output. Various outputs are combined in an operational amplifier to provide the MTF output.

An object of the present invention is to provide a reliable, direct, inexpensive and accurate instrument for the measurement of atmospheric spectral characteristics.

Another object is to provide a processing technique for the measurement of the modulation transfer function of the medium.

Still another object is to provide an instrument for the measurement of MTF within specific infrared spectral bands.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
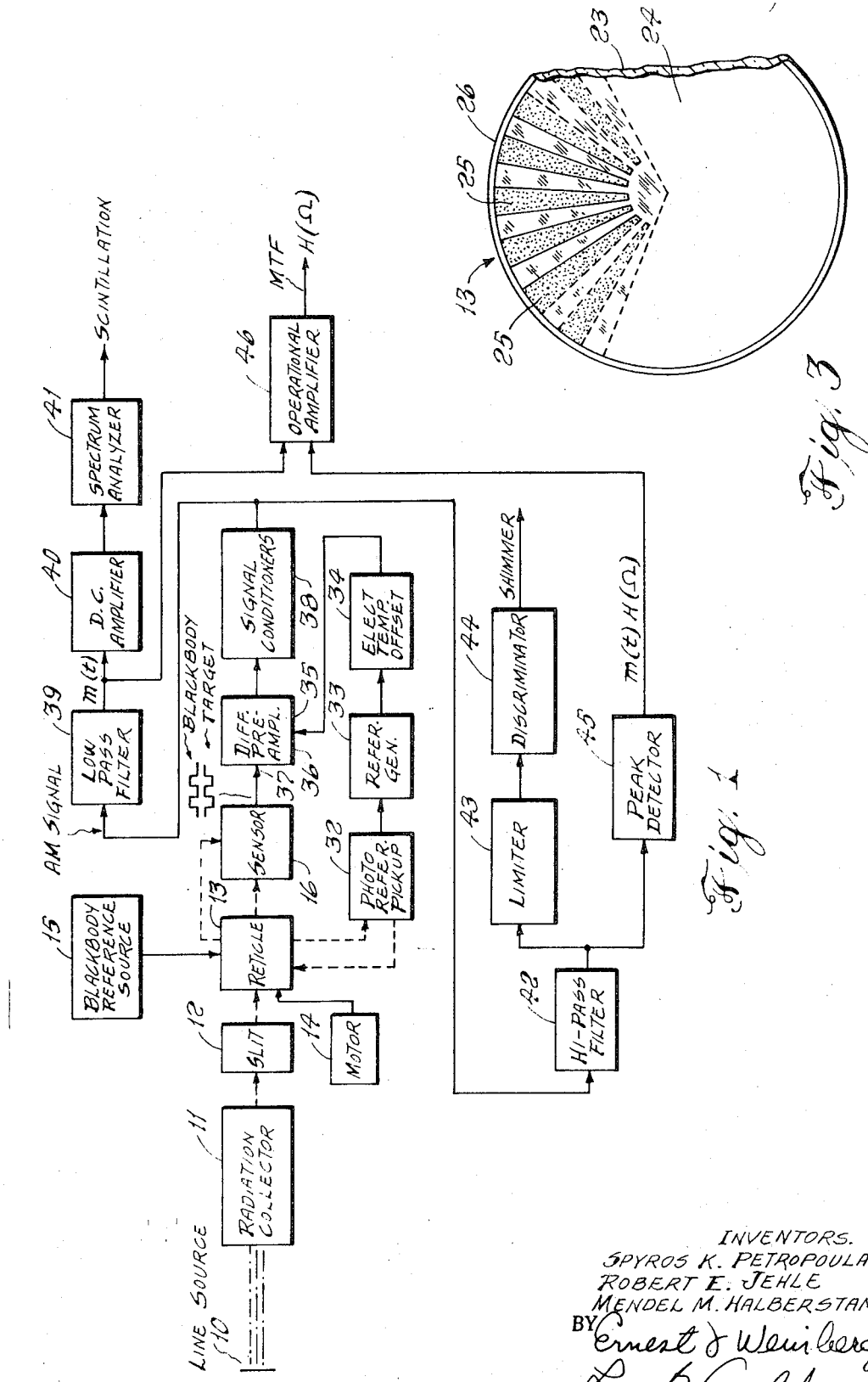
FIG. 1 is a block diagram of an instrument made in accordance with the principle of this invention.

In the embodiment of the invention shown in FIG. 1, a live source of radiant energy 10 which may be in the infrared region and consists of a string of quartz iodide lamps approximately 1 cm. in width, 96 inches long at distances of 500 to 5,000 yards, is directed through the intervening atmosphere and impinges on the radiation collector 11 which in turn applies the received energy through slit 12 on to a rotating reticle 13 driven by a motor 14. A blackbody reference source 15 directs its output to the slit and reticle combination and the energy from the live source and the reference source are both fed to a sensor 16. The structural relations of these components are clearly illustrated in FIG. 2 wherein the radiation collector 11 is a Cassegrainian-type system. This consists of a paraboloid primary mirror 17 and a secondary hyperboloid mirror 18. The mirror can be fabricated of "CERVIT" with a protective coating of SiO added to the surfaces. The collected energy is directed by the collector 11 through a centrally disposed exit opening 19 in the rear wall housing 20 of the primary mirror 17 into assembly 21 and focus at the image plane mary mirror 17 into assembly 21 and focus at the image plane 22. Disposed at the image plane is the reticle 13 with the slit assembly 12 just forward thereof. Both are provided with standard mounting and supporting structures as well as the reticle drive motor 14 coupled to the reticle, which specific structures are not shown. The slit assembly is constructed so as to accommodate interchangeable slits of up to 200 microns in both width and length and be capable of manual vertical displacement, independent of the reticle over its entire range. The centroid of the slit in its "zero" position is coextensive with the optical axis of the collector.

The reticle 13 of FIG. 3, in combination with the slit, modulates the image at various spatial frequencies by the pie-shaped pattern thereof and comprises a spatial modulation means. The pattern consists of alternate reflective and transmissive sectors (60 of each) formed by a rear face 23 of a transmissive substrate composed of KRS-5 of IRTRAN-2 or 4 or germanium and having on the front face 24 reflective sectors 25 of a gold coating. The reticle is supported for central rotation by the drive belt 26 and both the slit and reticle can move as one assembly relative to the optical axis. Relative movement therebetween is also provided.

Figure 2:
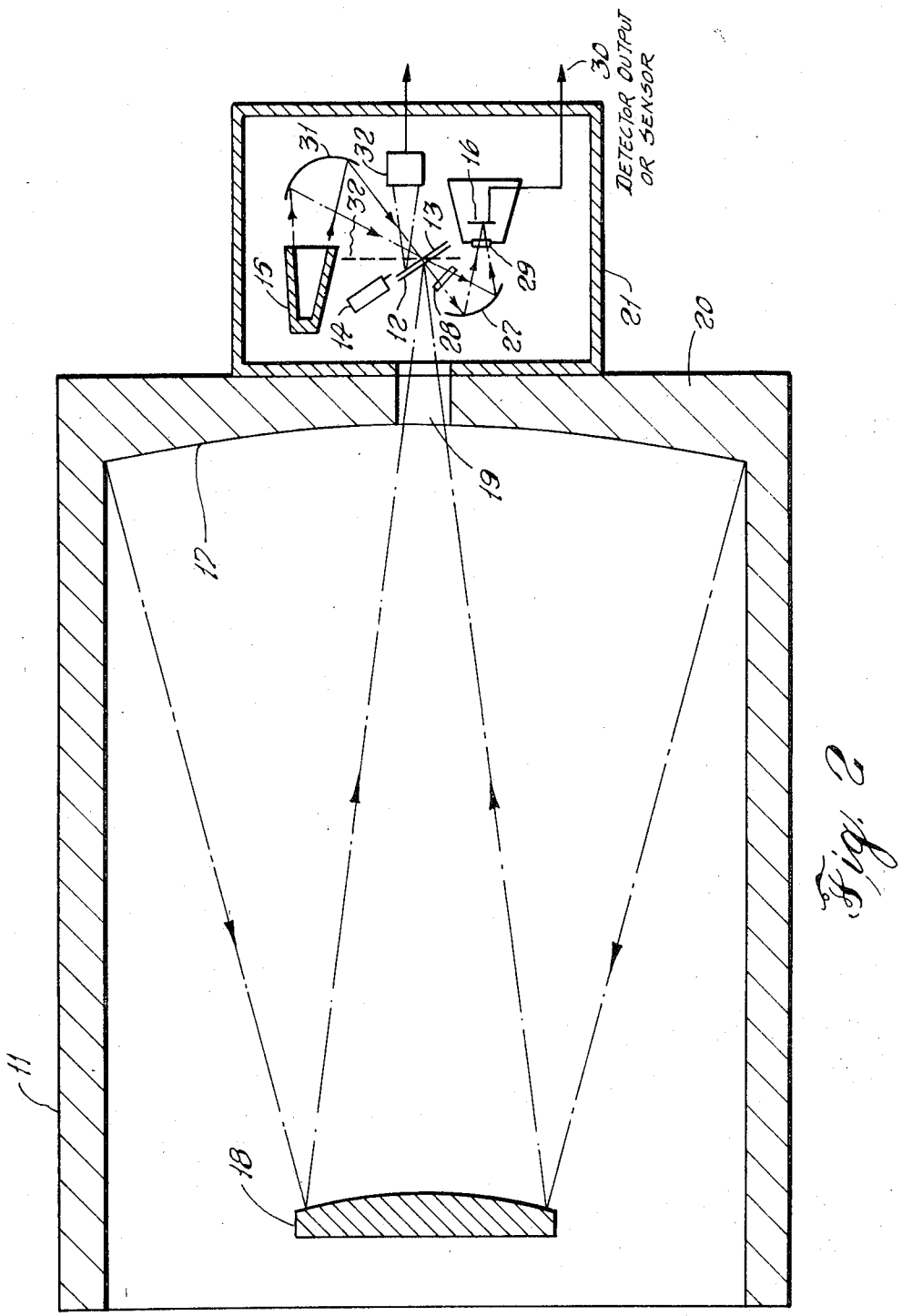
FIG. 2 is a sectional view of the radiation collector and sensor assembly of FIG. 1; and, FIG. 3 is a front view of the reticle used with the instrument.

Considering again the illustration of FIG. 2, the radiant energy enters the assembly 21, passes through the slit, and when it impinges on a reflective sector of the reticle it is reflected toward auxiliary mirror 27 via filter 28, which restricts the energy to the desired spectral band. The mirror 27 directs the energy through another infrared filter 29 and on to a sensor or detector 16 which is housed in refrigerated unit 30, as is standard procedure. Radiation from a blackbody reference source 15 is directed by mirror 31 through the transmissive sectors of the reticle 13 and focused on detector 16 in the same manner as the target radiation. There is also provided a photoreference pickup 32 which focuses a small narrow beam of light on the reticle and senses the reflected light therefrom, which is in sync with the rotating reticle. The photoreference pickup 32 does not in anyway interfere with the target or blackbody radiation. The pickup 32 provides a sync signal to a reference generator 33 or oscillator where the signal is shaped, and which, in turn, feeds the electronic temperature offset 34. The offset amplifier 34 provides $a-e$ signals of variable amplitude and in phase with or 180° out of phase with the radiation incident upon the detector, the phase being selectable. The output of the offset 34 is applied to one input 35 of the differential preamplifier 36, while the other input 37 receives the detector or sensor 16 output, thereby controlling the difference output between the target and reference signal by applying either in phase gain or 180° out of phase loss to provide better signal to noise ratios. The term "temperature" refers to the target intensity. The temperature offset can be set by adjusting its level and phase without any target radiation input (only background) so as to buck out the background radiation. The differential output is applied to signal conditioners or amplifiers 38 which may also include band-pass filters, and alternators and whose output is an amplitude modulated signal.

Scintillation is the result of changes in the optical path so as to produce amplitude variations at the receiver from a constant amplitude signal source. The output of amplifiers 38 is an amplitude modulated signal which mathematically consists of two parts, scintillation information $\frac{1}{2}m(t)$ and a high-frequency carrier information signal of the general form $m(t)H(\Omega)\cos(wt+\phi)$ where $H(\Omega)$ is the modulation transfer function and the cosine term is the carrier frequency. (These terms are more fully defined in the appendix following this description.)

The signal conditioner 38 output is applied to the low-pass filter 39 wherein all the terms or signals are filtered out except the low-frequency $m(t)$ signal, which is proportional to the atmospheric scintillation after passing through DC amplifier 40. The output of the DC amplifier is applied to a spectrum analyzer 41 whose output indicated the scintillation spectrum of the atmospheric intervening path.

Shimmer is the result of many factors, primary of which are changes in the index of refraction along the radiation path. This results in apparent changes in the position coordinates of the target at the receiver: the image appears to move while the target or source is stationary and produces a changing frequency and phase. Such effect is like that of viewing an object through a medium that is being heated. It should be borne in mind that since the slit and the reticle can move transversely relative to one another and to the optical axis of the system, the image is modulated at various spatial frequencies. The output of the signal conditioners is also applied to high-pass filter 42, wherein the low-frequency factor $m(t)$ is eliminated and the resultant signal is amplitude limited by the limiter 43 having as its output an angle-modulated signal. Discriminator 44 then, as in FM provides a voltage output which is proportional to the argument of the cos term and a signal characteristic of the atmospheric shimmer.

Modulation transfer function effect is thought to be primarily caused by a scattering effect and is the curve or plot of the normalized contrast vs. the spatial frequency in line pairs per millimeter. The high-pass filter eliminates the low-frequency scintillation information and its output is applied to a peak detector 45, which eliminates the carrier frequency term and provides a signal which is proportional to $m(t)H(\Omega)$. This latter signal as well as the output $m(t)$ of low-pass filter 39 are fed into the two inputs of an operational amplifier 46, which effectively divides the input terms so that its output is proportional to the $H(\Omega)$ term or the atmospheric modulation transfer function MTF. This is similar to the action of triode where the $m(t)$ signal term is applied to the cathode and the $m(t)H(\Omega)$ term to the grid with a resultant plate signal proportional to $H(\Omega)$.

APPENDIX

The modulation waveform or the slit-reticle combination can be approximated by the Fourier series $$M(\theta) = \frac{1}{2} + \frac{2}{\pi} \sum_{n=0}^{\infty} \frac{(-1)^n}{2n+1} \cos(2n+1) \frac{2\pi\theta}{7\theta_0}$$

where, $\Theta$ is the angular displacement of the reticle.

$\Theta_0$ is the angle subtended by two adjacent sectors of the reticle, and $x$ & $y$ are linear coordinates having their axes at the center of the reticle. For a small region of the reticle, $\Theta \approx (x/y)$.

Thus, $$M\left(\theta = \frac{1}{2} + \frac{2}{\pi} \sum_{n=0}^{\infty} \frac{(-1)^n}{2n+1} \cos(2n+1) \frac{x}{y\theta_0}\right)$$

Now let $\bar{u} = y w$; $2\pi/\Theta_0 = N$; $\Omega = 2\pi/y\Theta_0$ where, $\bar{u}$, is the average tangential velocity of the region of the reticle defined by the slit position, $w$ is the reticle angular velocity, $N$ is the number of cycles (pairs of transmissive and reflective sectors) on the reticle, and $\Omega$ is $2\pi$ times the spatial frequency at distance $y$ from the center of the reticle.

The modulation waveform thus takes the form:

$$M(x-\bar{v}t) = \frac{1}{2} + \frac{2}{\pi} \sum_{n=0}^{\infty} \frac{(-1)^n}{2n+1} \cos(2n+1)(\Omega x - N\omega t) \quad \text{(A-1)}$$

Let now $h(x)$ be the line spread function of the instrument, and $h(x-ut)$ be the line spread function due to atmospheric shimmer, where $u$ is the shimmer random image velocity.

Let also $m(t)$ represent the modulation of the image due to atmospheric scintillation.

Then, the output signal, $s$, of the detector is:

$$s = km(t) \int_{-L/2}^{L/2} h(x-ut) M(x-\bar{v}t) dx \quad \text{(A-2)}$$

where, $k$ is the transfer function of the detector and slit, and $L$ is the length of the slit.

Substituting eq. A-1 into A-2 we get $$s = km(t) \int_{-L/2}^{L/2} h(x-ut) \left[\frac{1}{2} + \frac{2}{\pi} \sum_{n=0}^{\infty} \frac{(-1)^n}{2n+1}\right.$$
$$\left. \cos(2n+1)(\Omega x - N\omega t)\right] dx$$

Letting $x-ut=z$ we obtain $$s = km(t) \int_{-L/2}^{L/2} h(z) \left\{\frac{1}{2} + \frac{2}{\pi} \sum_{n=0}^{\infty} \frac{(-1)^n}{2n+1}\right.$$
$$\left. \cos[(2n+1)(\Omega ut + \Omega z - N\omega t)]\right\} dz$$

or, $$s = \frac{1}{2} km(t) \int_{-L/2}^{L/2} h(z) dz$$
$$+ \frac{2}{\pi} km(t) \sum_{n=0}^{\infty} \frac{(-1)^n}{2n+1} \int_{-L/2}^{L/2} h(z)$$
$$\cos\{(2n+1)[(\Omega u - N\omega)t + \Omega z]\} dz$$

if we now let $$k \int_{-L/2}^{L/2} h(z) d(z) = 1$$

and we use electronic filtering so as to retain the zeroth harmonic, or fundamental of the detector output signal, we obtain:

$$s' = \frac{1}{2} m(t) + \frac{2}{\pi} km(t) \int_{-L/2}^{L/2} h(z) \cos(\Omega z) \cos[(\Omega u$$
$$-N\omega)t] dz - \frac{2}{\pi} km(t) \int_{-L/2}^{L/2} h(z) \sin(\Omega z) \sin[(\Omega u - N\omega)t] dz$$

or $$s' = \frac{1}{2} m(t) + \frac{2}{\pi} km(t) \left\{\cos[(\Omega u - N\omega)t] \int_{-L/2}^{L/2} h(z) \cos\Omega z\right.$$
$$\left. - \sin[(\Omega u - N\omega)t] \int_{-L/2}^{L/2} h(z) \sin\Omega z dz\right\}$$

If the length of the slit substantially exceeds the distance between the first minimal of the line spread function, the limits $-L L/2$ and $+L/2$ can be replaced by $-\infty$ and $=\infty$, respectively. For this case, $$\int_{-L/2}^{L/2} h(z) \cos\Omega z dz \approx \int_{-\infty}^{+\infty} h(z) \cos\Omega z dz = H_c$$

and $$\int_{-L/2}^{L/2} h(z) \sin\Omega z dz \approx \int_{-\infty}^{+\infty} h(z) \sin\Omega z dz = H_s$$

$H_s$ and $H_c$ can be easily recognized as the sine and cosine Fourier Transforms, respectively, of $h(z)$.

Thus, $$s' = \frac{1}{2} m(t) + \frac{2}{\pi} km(t) \{H_c \cos[(\Omega u - N\omega)t]$$
$$-H_s \sin[(\Omega u - N\omega)t]\}$$

or $$s' = \frac{1}{2} m(t) + \frac{2}{\pi} km(t)\sqrt{H_s^2 + H_c^2} \cos\{[(\Omega u - N\omega)t + \phi(t)]\}$$

where $$\phi(t) = \tan^{-1} \frac{H_s}{H_c} \qquad (A-3)$$

or $$s' = \frac{1}{2} m(t) + \frac{2}{\pi} km(t)H(\Omega) \cos\{(N\omega - \Omega u)t + \phi(t)\} \quad (A-4)$$

where $$H(\Omega) = \sqrt{H_s^2 + H_c^2} = \text{modulation transfer function (MTF)}$$

By normalizing the transfer function of the signal processing electronics up to and including the signal conditioners, eq. A-4 can be considered as the output waveform of the signal conditioners.

The information contained in $S'$, as given by equation 10, can be extracted according to the demodulation scheme shown in FIG. 1, as follows:

To obtain the scintillation spectrum of the atmospheric path the signal $S'$ is first passed through the low-pass filter 39. Since the highest significant frequency components of $m(t)$ are substantially lower than the lowest value of the quantity ($\Omega u - Nw$), the effect of the low-pass filter 39 will be to retain only the term $(\frac{1}{2})m(t)$ in equation A-4. After amplification (40) and the processing through a spectrum analyzer (41) the scintillation spectrum of the atmospheric path is obtained.

The signal $S'$ is, according to FIG. 1, also passed through the high-pass filter 42 which removes the term $(\frac{1}{2}) m(t)$ in equation A-4. The output of this filter will be a signal $S''$ proportional to $m(t) H(\Omega) \cos[(Nw-\Omega u) t+\phi(t)]$, which is an amplitude and angle modulated signal.

By processing $S''$ through the limiter 43 so as to obtain an equal amplitude angle modulated signal and subsequently through the discriminator 44, a signal proportional to the argument of the cosine is obtained. This signal will contain the characteristics of atmospheric shimmer.

The signal $S''$ is also passed through the peak detector 45 which produces a signal proportional to $m(t) H(\Omega)$. This signal and the output of the low-pass filter 39 are then fed into the operational amplifier 46 which divides $m(t) H(\Omega)$ by $m(t)$; a signal, proportional to $H(\Omega)$, thus results.

We claim:

1. A radiation image analyzer comprises:
   a radiation collector directed for receiving an input from a distant live source and directing an output into a spatial frequency modulation means for providing a variable modulated output,
   a source of reference radiation having its output directed toward said modulation means,
   a detector for providing an electrical output in response to its radiation input and adapted to receive said output of said modulation means,
   a differential amplifier having a pair of inputs and an output,
   synchronization means coupled to said modulation means for generating a variable output selectively in phase and 180° out of phase with said spatial frequency,
   said output of said detector being connected to one of said differential amplifier inputs, and
   a low-pass filter connected to receive the output of said differential amplifier and having its output connected to
   a DC amplifier whose output in turn is connected to
   a spectrum analyzer,
   whereby said analyzer will indicate the scintillation spectrum of the radiation path,
   means to provide an indication of the shimmer introduced by the radiation path connected to the output of the differential amplifier,
   means to provide an indication of the modulation transfer functions of the radiation path connected to said signal path of the means to provide an indication of the shimmer introduced by the radiation path and to said low-pass filter.

2. The analyzer according to claim 1 wherein said spatial modulation means comprises
   a reticle having alternate radiation transmissive and reflective pie-shaped sectors,
   and an opaque member disposed between said collector and said reticle and having a transverse slit therein, and
   means coupled to said reticle for rotation thereof.

3. The analyzer according to claim 2 wherein said sychronization means includes
   a photoreference pickup for providing a signal output in phase with the rotation of said transmissive and reflective sectors,
   a reference generator connected to receive said output of said pickup for generating a reference signal therefrom, and
   a variable output level amplifier connected to receive the output of said reference generator.

4. The analyzer according to claim 3 further including signal conditioners interposed between said differential amplifier and said low-pass filter.

5. The analyzer according to claim 4 further including
   high-pass filter having its input connected to the output of said signal conditioners and its output connected to
   an amplitude limiter whose output in turn is connected to
   a discriminator whose output provides an electrical indication of the shimmer introduced by the radiation path.

6. The analyzer according to claim 5 further including
   an operational amplifier having a pair of inputs and an output,
   a peak level detector having its input connected to the output of said high-pass filter and its output connected to one of said pair of inputs of said operational amplifier, and
   coupling means connecting the output of said low-pass filter to the other of said pair of inputs of said operational amplifier,
   whereby said output of said operational amplifier will be proportional to the modulation transfer function of said radiation path.

* * * * *